Patented Nov. 1, 1949

2,486,385

UNITED STATES PATENT OFFICE 2,486,385

RECOVERY OF OILS

John W. Beckman, Oakland, Calif., assignor to Marian O. Palmer, Oakland, Calif.

No Drawing. Application June 7, 1947, Serial No. 753,387

2 Claims. (Cl. 195—3)

This invention relates to the recovery of oils and fats from the cells of animal and vegetable matter.

It has been usual heretofore to recover oils and fats from animal and vegetable materials by one or a combination of two processes. According to the first, the material is crushed, cooked and thereafter subjected to high pressure applied continuously or intermittently to force the oil or fat from the material. The second process consists in extracting the desired oil or fat with a suitable solvent such as a light petroleum fraction, the material usually being crushed prior to extraction. In either case, the equipment required is relatively expensive, the operation slow and time consuming and, because of the employment of heat, degradation of the oil and fat usually occurs, some of the natural glycerides being converted to fatty acids which must subsequently be removed by a refining operation.

I have discovered that the oils and fats present in animal and vegetable material can be recovered in relatively simple equipment, without the applicaton of the heat heretofore usual in the art and without excessive increase in the fatty acid content of the material undergoing treatment. These and other valuable and important features I am able to attain by suitably comminuting the material and then subjecting it in an aqueous medium to the action of suitable enzymes acting upon the cellular and intercellular structure of the material to destroy this to such an extent that the contained oil or fat is released, the latter then separating at least in part ino a supernatant layer so that it can be readily recovered.

It is important that the material to be treated should be suitably comminuted for, as will presently appear, in this way I have found I am able to avoid any substantial degradation of the glycerides present. It is recognized that glycerides are hydrolyzed in the presence of water to produce fatty acids and glycerin. Under ordinary conditions, at ordinary temperatures, and over relatively short periods of time, this reaction is very slow, but it takes place to an appreciable degree when a long period of time is involved and to a considerable degree at higher temperatures. Also, the reaction is considerably hastened by the presence of acid or basic catalysts, or by certain enzymes.

Quite unexpectedly I have discovered that the hydrolysis of the glycerides can be substantially if not entirely eliminated by suitably comminuting the material to an extremely finely divided form, e. g. to a paste or butterlike form.

For example, and to illustrate the practice of my process, a batch of peanuts was divided into two parts. One was ground to a butter-like consistency wherein all of the material would pass a 100 mesh screen and only 57.2% was retained on a 200 mesh screen, while the other was comminuted so that all of the material would pass a 16 mesh screen and 85.4% was retained on a 100 mesh screen. The two materials were then subjected to the action of the same proteolytic enzyme at 50° C. While it required only 48 hours for liberation of the oil contained in the first batch, 168 hours were required for liberation of the oil contained in the second batch. The fatty acid content of the two batches was 0.46% after grinding; the fatty acid content of the first batch of oil increased to 2.4% while that of the oil from the second batch increased to 7.8% at the end of 72 hours and, at the completion of the fermentation, had increased to 10.2%.

In practicing the invention, the animal or vegetable material is first suitably comminuted. The degree of comminution is important, and indeed the essence of this invention, but is difficult of explanation. It is not to be performed by methods which crush the cells, or to an extent wherein individual cells are physically separated from all other structure. In other words the cell contents are not to be released by the grinding but by the fermentation step. Further, methods which involve treatment for a long period or cause a substantial rise in temperature are to be avoided. I have found that a machine of the type shown in Rietz Patent No. 2,082,419 is well suited for proper comminution of the vegetable material.

The ground material is then made up into an aqueous suspension, sufficient water being added to make the mass of a mush-like consistency. The enzyme source is then added. The particular enzyme utilized is suited to the nature of the material to undergo cellular destruction. For example, when the cell structure is mainly composed of proteins, a proteolytic enzyme should be utilized. One can utilize a mixture of enzymes so that various of these are acting simultaneously; or one can utilize an enzymatic source such as brewers malt which, as is well known, contains several proteolytic and amylolytic enzymes. Also, one can utilize a bacterial source of an enzyme such as lactic acid producing bacteria; in this case it may be necessary to provide additional food for the bacteria, the food maintaining the bacterial life while the enzyme associated with the bacteria acts separately upon the cellular animal or vegetable matter. In the case of lactic acid bacteria, it is of advantage to add material containing or yielding hexoses such as cane sugar, molasses, starches and the like to provide food and further propagation media supplementing that of the cellular material undergoing disintegration.

The temperature utilized should be that most favorable to the operation of the process and to the enzymatic action. Usually one can employ temperatures in the range of 45° C. to 60° C.

The pH of the aqueous media should also be carefully controlled so that it does not pass into a range unfavorable to the enzymatic action, e. g. by adding an alkaline calcium salt.

I claim:

1. In a fermentation process for release of oil from organic materials, the steps consisting of complete reduction of the material to particles of a microscopic but multicellular size while avoiding any substantial rupture of the cells, and thereafter subjecting to a controlled enzymatic fermentation for release of the oil from the cells.

2. A process consisting of completely reducing cellular oil-containing organic material to a particle size microscopic but larger than single cells, while avoiding substantial temperature increase and cell rupture, adding water to give a thin consistency, incubating for a period between 24 and 90 hours in the presence of enzymatic agents active to release oil from the cells and at a temperature between about 45° C and 60° C., then separating released oil from the mixture.

JOHN W. BECKMAN.

REFERENCES CITED

The following references are of record in the file of this patent:

UNITED STATES PATENTS

| Number | Name | Date |
|---|---|---|
| 1,751,331 | Hocker | Mar. 18, 1920 |
| 1,892,449 | Dengler | Dec. 27, 1932 |
| 2,074,441 | Van Sant | Mar. 23, 1937 |
| 2,325,328 | Lachle | July 27, 1943 |

OTHER REFERENCES

Ind. and Eng. Chem., vol. 22, No. 2, Feb. 1930, pp. 117, 118, by Beckman.